US012755393B2

(12) United States Patent
Chiu et al.

(10) Patent No.: US 12,755,393 B2
(45) Date of Patent: *Oct. 6, 2026

(54) RGBD VIDEO SEMANTIC SEGMENTATION WITH TEMPORAL AND GEOMETRIC CONSISTENCY

(71) Applicant: SRI International, Menlo Park, CA (US)

(72) Inventors: Han-Pang Chiu, West Windsor, NJ (US); Junjiao Tian, Atlanta, GA (US); Zachary Seymour, Pennington, NJ (US); Niluthpol C. Mithun, Dayton, NJ (US); Alex Krasner, Princeton, NJ (US); Mikhail Sizintsev, Highland Park, NJ (US); Abhinav Rajvanshi, Plainsboro, NJ (US); Kevin Kaighn, Medford, NJ (US); Philip Miller, Yardley, PA (US); Ryan Villamil, Plainsboro, NJ (US); Supun Samarasekera, Skillman, NJ (US)

(73) Assignee: SRI International, Menlo Park, CA (US)

( * ) Notice: Subject to any disclaimer, the term of this patent is extended or adjusted under 35 U.S.C. 154(b) by 223 days.

This patent is subject to a terminal disclaimer.

(21) Appl. No.: 18/798,526

(22) Filed: Aug. 8, 2024

(65) Prior Publication Data

US 2024/0404072 A1 Dec. 5, 2024

Related U.S. Application Data

(63) Continuation of application No. 17/496,403, filed on Oct. 7, 2021, now Pat. No. 12,062,186.

(Continued)

(51) Int. Cl.

*G06T 7/174* (2017.01)
*G06T 3/40* (2006.01)

(Continued)

(52) U.S. Cl.

CPC ................ *G06T 7/174* (2017.01); *G06T 3/40* (2013.01); *G06T 7/38* (2017.01); *G06T 7/50* (2017.01);

(Continued)

(58) Field of Classification Search

CPC .......... G06N 3/045; G06N 3/08; G06N 20/00; G06N 3/02; G06N 3/04;

(Continued)

(56) References Cited

U.S. PATENT DOCUMENTS 10,452,960 B1 10/2019 Yingmao
10,635,927 B2 4/2020 Chen (Continued)

FOREIGN PATENT DOCUMENTS

CN 110298361 A 10/2019
CN 111311615 A 6/2020

(Continued)

OTHER PUBLICATIONS

Hazirbas, Caner, et al. "Fusenet: Incorporating depth into semantic segmentation via fusion-based cnn architecture." *Asian conference on computer vision*. Springer, Cham, 2016, 15 pages.

(Continued)

*Primary Examiner* — Henok Shiferaw
*Assistant Examiner* — Woo C Rhim
(74) *Attorney, Agent, or Firm* — MOSER TABOADA

(57) ABSTRACT

A method, machine readable medium and system for RGBD semantic segmentation of video data includes determining semantic segmentation data and depth segmentation data for less than all classes for images of each frame of a first video, determining semantic segmentation data and depth segmentation data for images of each key frame of a second video including a synchronous combination of respective frames of the RGB video and the depth-aware video in parallel to (Continued)

the determination of the semantic segmentation data and the depth segmentation data for each frame of the first video, temporally and geometrically aligning respective frames of the first video and the second video, and predicting semantic segmentation data and depth segmentation data for images of a subsequent frame of the first video based on the determination of the semantic segmentation data and depth segmentation data for images of a key frame of the second video.

20 Claims, 11 Drawing Sheets

Related U.S. Application Data

(60) Provisional application No. 63/088,803, filed on Oct. 7, 2020.

(51) Int. Cl.
*G06T 7/38* (2017.01)
*G06T 7/50* (2017.01)

(52) U.S. Cl.
CPC .............. *G06T 2207/10016* (2013.01); *G06T 2207/10024* (2013.01); *G06T 2207/20112* (2013.01)

(58) Field of Classification Search
CPC . G06T 2207/10024; G06T 2207/10028; G06T 7/11; G06T 2207/20081; G06T 2207/20084; G06T 2207/10016; G06T 7/174; G06T 7/55; G06T 2207/20221; G06T 7/10; G06T 7/12; G06T 7/143; G06T 3/0093; G06T 3/40; G06T 7/38; G06T 7/50; G06T 2207/20112; G06T 2207/30252; G06T 7/285; G06T 7/292; G06F 18/25; G06F 18/24; G06V 10/82; G06V 10/764; G06V 10/80; G06V 20/41
See application file for complete search history.

(56) References Cited

U.S. PATENT DOCUMENTS

| | | | | |
|---|---|---|---|---|
| 10,810,445 | B1 | 10/2020 | Kangaspunta | |
| 2017/0337693 | A1 | 11/2017 | Baruch | |
| 2017/0372479 | A1 | 12/2017 | Somanath | |
| 2018/0150727 | A1 | 5/2018 | Farooqi | |
| 2018/0174311 | A1 | 6/2018 | Kluckner | |
| 2018/0189956 | A1 | 7/2018 | Mehr | |
| 2019/0043203 | A1 | 2/2019 | Fleishman | |
| 2019/0057509 | A1* | 2/2019 | Lv | G06T 7/254 |
| 2019/0287254 | A1 | 9/2019 | Lakshmi Narayanan | |
| 2020/0160546 | A1 | 5/2020 | Gu | |
| 2021/0073997 | A1 | 3/2021 | Vora | |
| 2021/0174513 | A1 | 6/2021 | Chidlovskii | |
| 2021/0365691 | A1* | 11/2021 | Ortiz Cuesta | G06V 10/50 |
| 2022/0101548 | A1 | 3/2022 | Li | |
| 2023/0129779 | A1* | 4/2023 | Sommer | G07G 1/0045 382/157 |

FOREIGN PATENT DOCUMENTS

| | | | |
|---|---|---|---|
| CN | 111340814 | A | 6/2020 |
| CN | 111738265 | A | 10/2020 |

OTHER PUBLICATIONS

Valada, Abhinav, Rohit Mohan, and Wolfram Burgard. "Self-supervised model adaptation for multimodal semantic segmentation." International Journal of Computer Vision (2019): 1-47.

Wang, Weiyue, and Ulrich Neumann. "Depth-aware cnn for rgb-d segmentation." Proceedings of the European Conference on Computer Vision (ECCV). 2018, 16 pages.

Lin, Di, et al. "Cascaded feature network for semantic segmentation of RGB-D images." Proceedings of the IEEE International Conference on Computer Vision. 2017, 9 pages.

Ma, Lingni, et al. "Multi-view deep learning for consistent semantic mapping with rgb-d cameras." 2017 IEEE/RSJ International Conference on Intelligent Robots and Systems (IROS). IEEE, 2017, 8 pages.

Kundu, Abhijit, Vibhav Vineet, and Vladlen Koltun. "Feature space optimization for semantic video segmentation." Proceedings of the IEEE Conference on Computer Vision and Pattern Recognition. 2016, 8 pages.

He, Yang, et al. "RGBD semantic segmentation using spatio-temporal data-driven pooling." arXiv preprint arXiv:1604.02388 (2016), 16 pages.

Xuan Luo, et al. "Consistent Video Depth Estimation." Proceedings of the IEEE Conference on Computer Vision and Pattern Recognition. 2020, 13 pages.

Jiao, Jianbo, et al. "Geometry-aware distillation for indoor semantic segmentation." Proceedings of the IEEE Conference on Computer Vision and Pattern Recognition. 2019, 10 pages.

Hoffman, Judy, Saurabh Gupta, and Trevor Darrell. "Learning with side information through modality hallucination." Proceedings of the IEEE Conference on Computer Vision and Pattern Recognition. 2016, 9 pages.

"Accel: A Corrective Fusion Network for Efficient Semantic Segmentation on Video" by Jain et al., the latest version published in Jul. 2019, pp. 1-10, arXiv:1807.06667v4 [cs.CV] (Year: 2019).

* cited by examiner

| Overall Performance | miOU | mACC |
|---|---|---|
| REG+D | 80.48 | 84.61 |
| RGBD + TempNet | **81.54** | 85.74 |

| IOU | fence | vegetation | pole | car | sign | pedestrian | lane mark | light |
|---|---|---|---|---|---|---|---|---|
| RGB + D | 95.67 | 76.08 | 66.5 | 94.82 | 66.54 | 26.99 | 71.34 | 70.02 |
| RGBD + T | 95.81 | 76.62 | 67.67 | 95.34 | **70.15** | **29.24** | 74.73 | 71.08 |

| ACC | fence | vegetation | pole | car | sign | pedestrian | lane mark | light |
|---|---|---|---|---|---|---|---|---|
| RGB + D | 97.97 | 87.67 | 70.81 | 98.13 | 68.94 | 28.7 | 77.12 | 80.2 |
| RGBD + T | **98.23** | **88.39** | 72.09 | **98.27** | **73.11** | **31.15** | 80.33 | 81.98 |

FIG. 8

RGBD VIDEO SEMANTIC SEGMENTATION WITH TEMPORAL AND GEOMETRIC CONSISTENCY

CROSS-REFERENCE TO RELATED APPLICATIONS

This application claims benefit of and priority to U.S. Provisional Patent Application Ser. No. 63/088,803, filed Oct. 7, 2020 and is a Continuation of U.S. patent application Ser. No. 17/496,403, filed Oct. 7, 2021, which will issue as U.S. Pat. No. 12,062,186 on Aug. 13, 2024, which are both herein incorporated by reference in their entireties.

GOVERNMENT RIGHTS

This invention was made with Government support under contract no. W9132V19C0003 awarded by the Engineering Research and Development Center (ERDC)—Geospacial Research Lab (GRL). The Government has certain rights in this invention.

FIELD

Embodiments of the present principles generally relate to a method, apparatus and system architecture for RGBD semantic segmentation of video data and, more particularly, to a method, apparatus and system architecture for RGBD semantic segmentation of video data having temporal and geometric consistency.

BACKGROUND

Semantic segmentation has been a growing topic in the computer vision and machine learning fields. Semantic segmentation can enable situational awareness and scene understanding. It is required for many applications, such as autonomous driving. Unlike typical semantic segmentation solutions that focus on RGB semantic segmentation, RGBD semantic segmentation is a new emerging field due to the popular availability of RGBD video sensors that provide depth information. The depth information of RGBD semantic segmentation provides complementary information in terms of fusion with RGB information. However, currently, most of RGBD semantic segmentation works are still image-based methods, which are unable to maintain consistency across video frames for semantic segmentation.

SUMMARY

Embodiments of methods, apparatuses and system architectures for RGBD semantic segmentation of video data having temporal and geometric consistency are disclosed herein.

In some embodiments a method for RGBD semantic segmentation of video data includes determining at least one of semantic segmentation data and depth segmentation data for less than all classes for images of each frame of a first video comprising at least one of RGB video frames and depth-aware video frames, determining at least one of semantic segmentation data and depth segmentation data for more classes than in the first video for images of each key frame of a second video comprising a synchronous combination of respective frames of the RGB video and the depth-aware video, (RGBD video), in parallel to the determination of the at least one of the semantic segmentation data and the depth segmentation data for each frame of the first video, temporally and geometrically aligning respective frames of the first video and the second video, and predicting at least one of semantic segmentation data and depth segmentation data for images of a subsequent frame of the first video based on the determination of the at least one of semantic segmentation data and depth segmentation data for images of a key frame of the second video.

In some embodiments, the method can further include a scaling process to raise an entropy of inconsistent pixels of frames of at least one of the first video or the second video.

In some embodiments, the first video and the second video are received from respective capture devices mounted on a mobile platform and the method can further include receiving motion data from at least one of an inertial measurement unit and a wheel odometry unit associated with the mobile platform and providing at least one of navigation information and scene information to the mobile platform for at least one scene captured using the respective capture devices based on the received motion data and the at least one of the semantic segmentation data and depth segmentation data determined for at least one of the first video and the second video.

In some embodiments a non-transitory machine-readable medium includes stored thereon at least one program, the at least one program including instructions which, when executed by a processor, cause the processor to perform a method in a processor based system for RGBD semantic segmentation of video data. In some embodiments the method includes determining at least one of semantic segmentation data and depth-related data for less than all classes for images of each frame of a first video comprising at least one of RGB video frames and depth-aware video frames, determining at least one of semantic segmentation data and depth-related data for more classes than in the first video for images of each key frame of a second video comprising a synchronous combination of respective frames of the RGB video and the depth-aware video, (RGBD video), in parallel to the determination of the at least one of the semantic segmentation data and the depth-related data for the images of each frame of the first video, temporally and geometrically aligning respective frames of the first video and the second video, and predicting at least one of semantic segmentation data and depth-related data for images of a subsequent frame of the first video based on the determination of the at least one of semantic segmentation data depth-related data for images of a key frame of the second video.

In some embodiments, the method of the non-transitory machine-readable medium further includes adjusting an entropy of inconsistent pixels of frames of at least one of the first video or the second video.

In some embodiments, the first video and the second video are received from respective capture devices mounted on a mobile platform and the method of the non-transitory machine-readable medium further includes receiving motion data from at least one of an inertial measurement unit and a wheel odometry unit, and providing at least one of navigation information and scene information to the mobile platform for at least one scene captured using the respective capture devices based on the received motion data and the at least one of the semantic segmentation data and depth-related data determined for at least one of the first video and the second video.

In some embodiments, a system for RGBD semantic segmentation of video data includes a processor and a memory coupled to the processor, the memory having stored therein at least one of programs or instructions executable by the processor. The programs or instructions when executed by the processor configure the system to determine at least one of semantic segmentation data and depth segmentation data for less than all classes for images of each frame of a first video comprising at least one of RGB video frames and depth-aware video frames, determine at least one of semantic segmentation data and depth segmentation data for more classes than in the first video for images of each key frame of a second video comprising a synchronous combination of respective frames of the RGB video and the depth-aware video, (RGBD video), in parallel to the determination of the at least one of the semantic segmentation data and the depth segmentation data for each frame of the first video, temporally and geometrically align respective frames of the first video and the second video, and predict at least one of semantic segmentation data and depth segmentation data for images of a subsequent frame of the first video based on the determination of the at least one of semantic segmentation data and depth segmentation data for images of a key frame of the second video.

In some embodiments, the system is further configured to adjust an entropy of inconsistent pixels of frames of at least one of the first video or the second video.

In some embodiments, the first video and the second video are received from respective capture devices mounted on a mobile platform and the system is further configured to receive motion data from at least one of an inertial measurement unit and a wheel odometry unit associated with the mobile platform and provide at least one of navigation information and scene information to the mobile platform for at least one scene captured using the respective capture devices based on the received motion data and the at least one of the semantic segmentation data and the depth segmentation data determined for at least one of the first video and the second video.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

FIG. 8 depicts a Table of improved semantic segmentation results for an RGBD semantic segmentation system of the present principles as a result of the application of a scaling process of the present principles.

Figure 1:
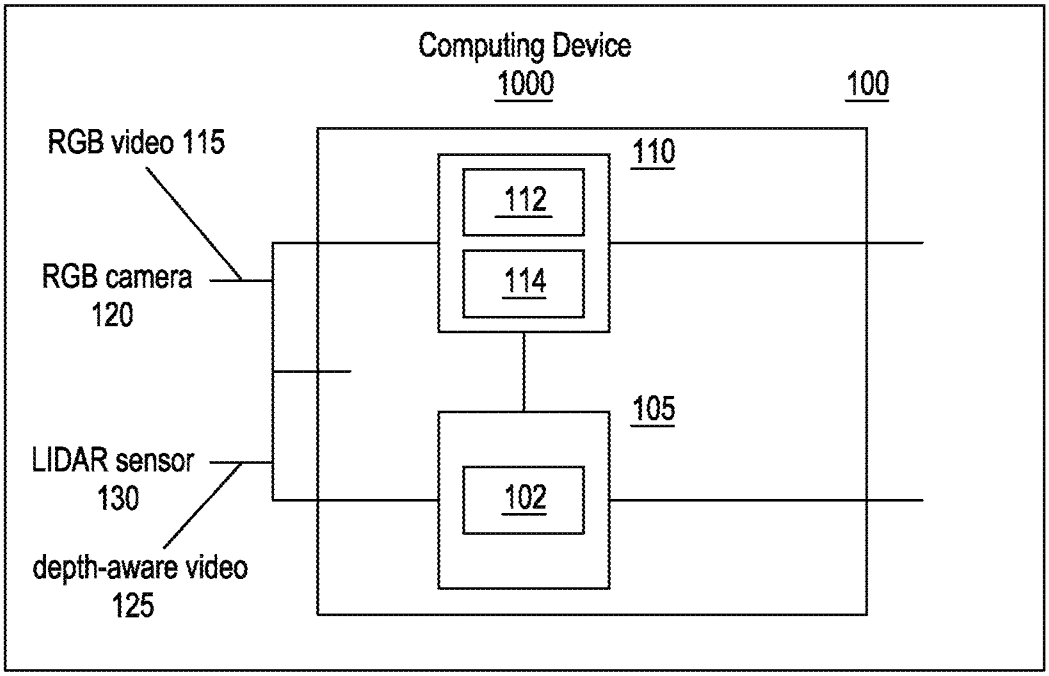
FIG. 1 depicts a high-level block diagram of a system for RGBD semantic segmentation of video in accordance with an embodiment of the present principles.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present principles generally relate to methods, apparatuses and systems for providing temporal and geometric consistent RGBD semantic segmentation of video data. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims. For example, although embodiments of the present principles will be described primarily with respect to specific input data and the with the implementation of the present principles to specific applications, such teachings should not be considered limiting. Embodiments in accordance with the present principles can be applied to other similar data and for other applications.

Embodiments of the present principles provide a novel approach for improving RGBD video semantic segmentation by, in some embodiments, incorporating temporal and geometry consistency from RGB and depth channels across video frames. In accordance with the present principles, a two-branch network architecture provides a fast branch and a slow branch, in which the fast branch performs quick updates in terms of RGB and depth channels across video frames of a video, while the slow branch performs detailed segmentation on key frames of an RGBD video comprised of a combination of the RGB video and the depth-aware video.

In some embodiments, the system architecture of the present principles incorporates alternating modality (temporal multi-modal fusion) to process sensor streams (RGB and depth channels) in an alternating fashion, which, in at least some embodiments includes propagating information from the slow branch to the fast branch.

In some embodiments of the present principles, a two-stage warping model approach includes a first step and a second step. In the first step, Ego-motion flow is estimated from depth and relative camera pose. By estimating and subtracting Ego-motion flow, two images can be made to seem closer to each other. The second step includes a Projected scene flow, which can be implemented to correct estimation error introduced by the Ego-motion flow of the first step.

FIG. 1 depicts a high-level block diagram of a system 100 for RGBD semantic segmentation of video in accordance with an embodiment of the present principles. As depicted in FIG. 1, embodiments of an RGBD semantic segmentation system of the present principles, such as the RGBD semantic segmentation system 100 of FIG. 1, can be implemented in a computing device 1000 (described in greater detail below). The RGBD semantic segmentation system 100 of FIG. 1 illustratively comprises a slow processing module 105 and a fast-processing module 110. In the embodiment of FIG. 1, the slow processing module 105 comprises an RGBD semantic segmentation processing module 102 and the fast-processing module 110 comprises an RGB semantic segmentation module 112 and a depth processing module 114. In the embodiment of FIG. 1, inputs to the RGBD semantic segmentation system 100 can include RGB video/data 115 from, for example an RGB camera 120 and depth-aware video/data 125 from, for example a LIDAR sensor 130.

Figure 2:
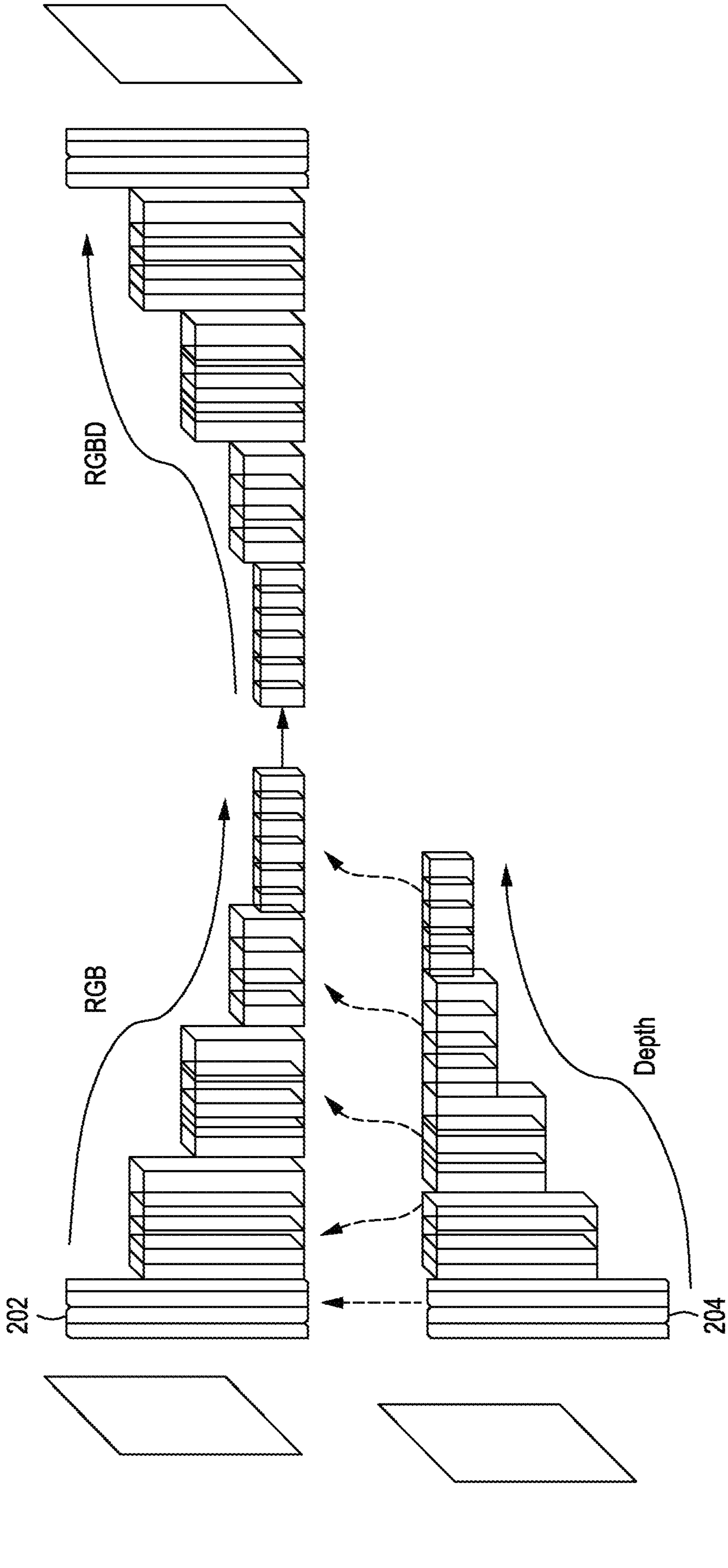
FIG. 2 depicts a functional block diagram of the operation of the RGBD semantic segmentation processing module of the slow processing module of the RGBD semantic segmentation system of FIG. 1 in accordance with an embodiment of the present principles.

FIG. 2 depicts a functional block diagram of the operation of the RGBD semantic segmentation processing module 102 of the slow processing module 105 of the RGBD semantic segmentation system 100 of FIG. 1 in accordance with an embodiment of the present principles. As depicted in the embodiment of FIG. 2, the RGBD semantic segmentation processing module 102 can have at least two branches having a parallel architecture to simultaneously compute RGB segmentation information and depth segmentation information of relative image frames. For example, in the embodiment of FIG. 2, the first branch 202 performs semantic segmentation on the frames of input video images captured using, for example, an RGB camera 120 (depicted in FIG. 1). The second branch 204 determines, for example, depth segmentation data on images captured by, for example, a Lidar sensor 130 (depicted in FIG. 1).

In the embodiment of FIG. 2, the RGBD semantic segmentation processing module 102 can further implement an attention mechanism to dynamically attend to different modalities.

In the embodiment of FIG. 2, the depth information determined in the second branch 204 can be incorporated (fused) into the semantic segmentation determined in the first branch 202, in some embodiments using a convolutional neural network. For example, in some embodiments, respective frames of the RGB video and frames of the depth-aware video can be processed in parallel as data from the depth-aware video frames are used in determining the sematic segmentation for the respective RGB video frames. In the embodiment of FIG. 2, the depth information is fused with the RGB data in the first branch 202 and then the combined RGB and depth data (RGBD data) is processed/encoded. The combined RGBD data can then be processed/decoded to determine RGBD semantic segmentation in the first branch 202.

Figure 3A:
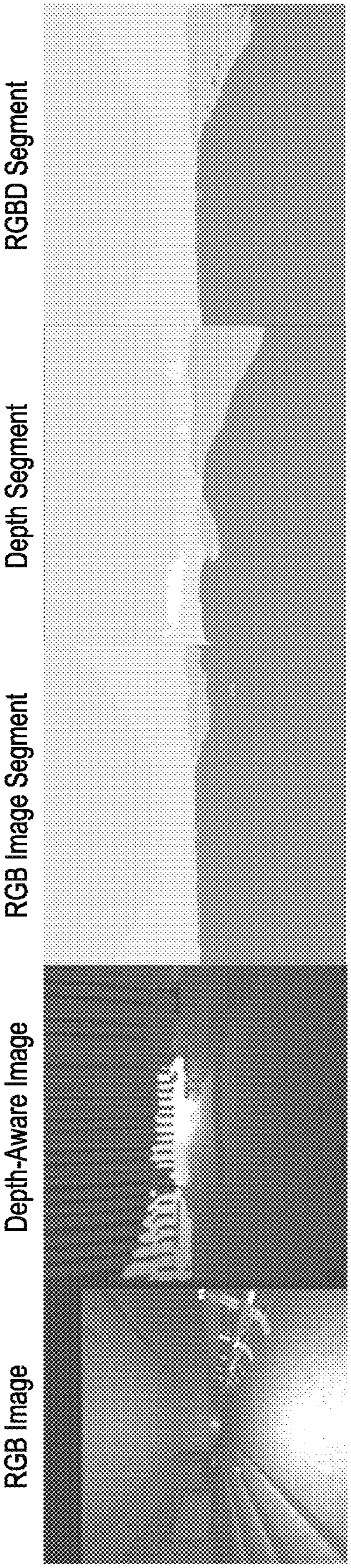
FIG. 3A depicts a first example of RGBD semantic segmentation in accordance with an embodiment of the present principles.
Figure 3B:
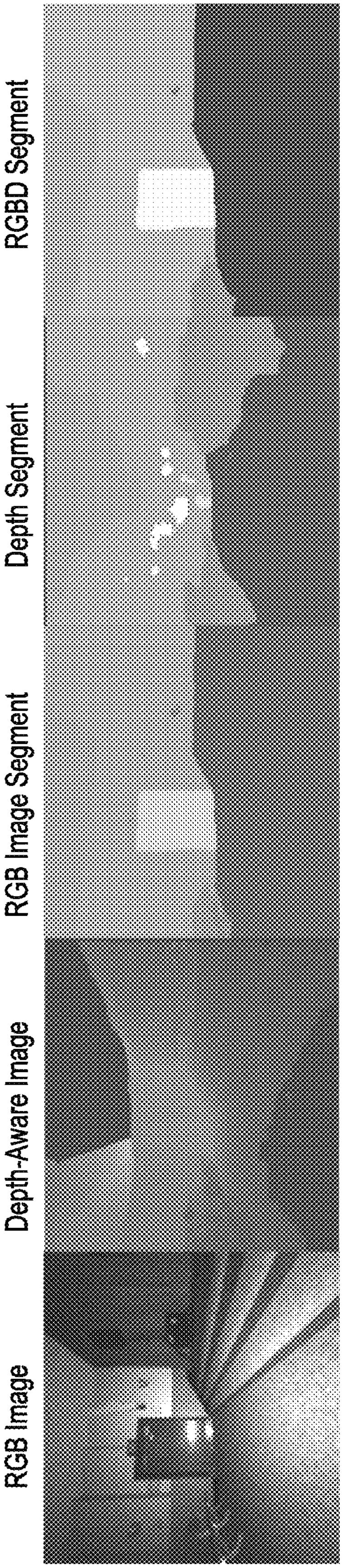
FIG. 3B depicts a second example of RGBD semantic segmentation in accordance with an embodiment of the present principles.

FIGS. 3A and 3B depict two examples of RGBD semantic segmentation that can result from the application of, for example, a depth-aware CNN process that can be implemented by the RGBD semantic segmentation processing module 102 of the RGBD semantic segmentation system 100 of FIG. 1. In FIG. 3A, a first frame, beginning from left to right, depicts an RGB image captured by, for example an RGB camera. The second frame in FIG. 3A depicts a depth-aware image captured by, for example, a LIDAR sensor. The third frame of FIG. 3A depicts a semantic segmentation of only the RGB image of the first frame and the fourth frame depicts a depth segmentation of the depth-aware image of the second frame. In FIG. 3A, a fifth frame depicts the segmentation of a combined RGB/depth-aware (RGBD) image resulting from a combination of data from the RGB image and data from the depth-aware image in accordance with the present principles. As depicted in the fifth frame of FIG. 3A, the segmentation of the RGBD image in accordance with the present principles provides most accurate and comprehensive semantic segmentation image for all classes of a captured scene.

FIG. 3B depicts a second example of RGBD semantic segmentation in accordance with an embodiment of the present principles. In FIG. 3B, a first frame, beginning from left to right, depicts an RGB image captured by, for example an RGB camera. The second frame in FIG. 3B depicts a depth-aware image captured by, for example, a LIDAR sensor. The third frame of FIG. 3B depicts a semantic segmentation of only the RGB image of the first frame and the fourth frame depicts a depth segmentation of the depth-aware image of the second frame. In FIG. 3B, a fifth frame depicts the segmentation of a combined RGB/depth-aware (RGBD) image resulting from a combination of data from the RGB image and data from the depth-aware image in accordance with the present principles. As depicted in the fifth frame of FIG. 3B, the segmentation of the RGBD image in accordance with the present principles provides most accurate and comprehensive semantic segmentation image for all classes of a captured scene.

Referring back to the RGBD semantic segmentation system 100 of FIG. 1, the fast-processing module 110 is capable of receiving RGB video inputs from, for example the RGB camera 120, and depth-aware video inputs from, for example, the LIDAR sensor 130. In some embodiments, the RGB video is processed by the fast-processing module 110 to produce semantically segmented video frames of the RGB video input using, for example the RGB semantic segmentation module 112. For example, the RGB semantic segmentation module 112 can implement a Machine Learning process and Convolutional Neural Networks to classify and segment features of the RGB video input to provide semantically segmented video frames of the RGB video.

Similarly, in the RGBD semantic segmentation system 100 of FIG. 1, the depth-aware video from, for example the LIDAR camera 130, can be processed by the depth processing module 114 of the fast-processing module 110 for providing depth information, such as by providing respective depth maps for the video frames. For example, in some embodiments, the depth processing module 114 can apply at least one of a machine learning process and a convolutional neural network, encoder-decoder process for generating depth information for frames of an input video. In some embodiments of the present principles, alternating RGB video frames and depth-aware video frames can be processed by the fast-processing module 110 to provide semantic segmentation of input RGB video frames as described in further detail below. For example, in some embodiments, in the fast-processing module 110, features of the RGB video frames and/or the depth-aware video frames are determined and at least one of a Machine Learning process and a Convolutional Neural Network can be applied to determine semantic segmentation of the input video frames. In alternate embodiments, whether to implement an RGB video frame or depth-aware video frame can be dependent on the make-up of a capture environment, pure randomness, and a consecutive number of frames that result in more efficient segmentation.

In accordance with embodiments of the present principles, the slow processing module 105 and the fast-processing module 110 can provide a two-branch network architecture, in which the fast branch performs quick updates in terms of RGB and depth channels across video frames of a video, while the slow branch performs detailed segmentation on key frames of the video. Temporal and geometric consistency is maintained between the video frames being processed by the slow processing module 105 and the video frames being processed by the fast branch 110 by sharing information/data between the slow processor 105 and the fast processor 110 during the respective processing of the video.

Figure 4:
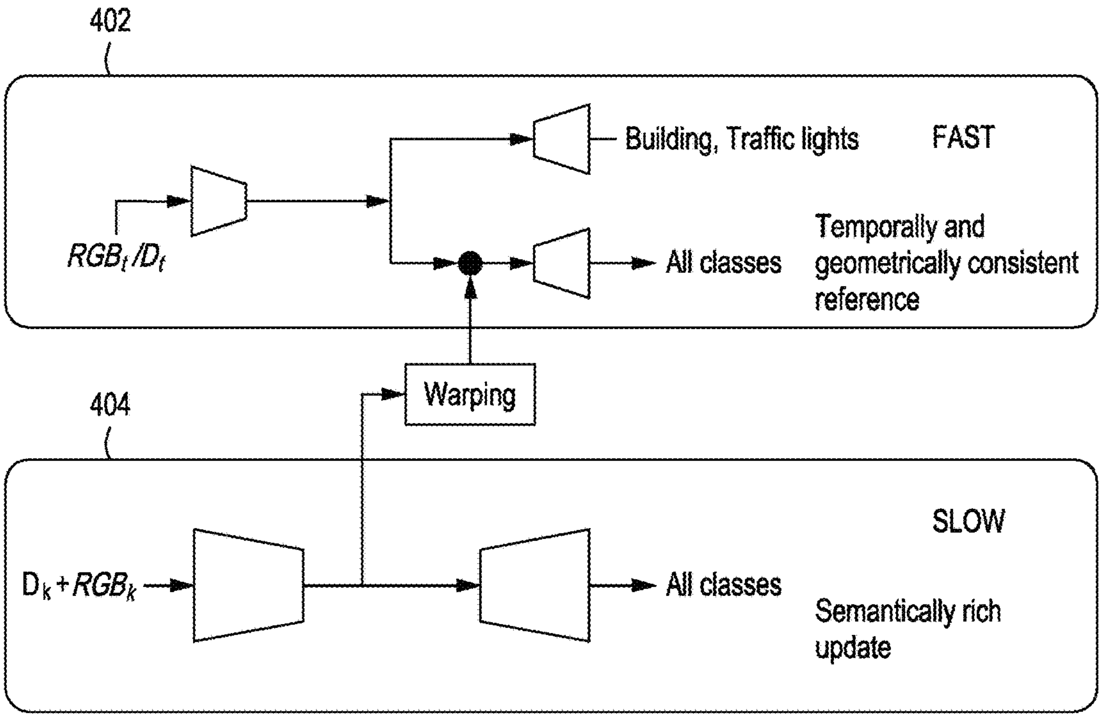
FIG. 4 depicts a block diagram of an exemplary architecture for a two-branch semantic segmentation system in accordance with an embodiment of the present principles.

For example, FIG. 4 depicts a block diagram of an exemplary architecture 400 for a two-branch semantic segmentation system in accordance with an embodiment of the present principles. In FIG. 4, t depicts a time, t, in the first video at which either an RGB video frame, RGB, or a depth aware video frame, D, is applied in a fast branch. Further, in the embodiment of FIG. 4, k depicts a key frame of a second video of a slow branch. In the embodiment of FIG. 4, a fast branch 402 processes input video frames of either an RBG input signal or a depth-aware input signal. A slow branch 404 in the embodiment of FIG. 4 processes key frames of processed RGBD semantic segmentation data. In accordance with an embodiment of the present principles, geometric and temporal consistency is maintained between frames of the first video in the fast branch 402 and key frames of the second video in the slow branch 404 by implementing warping.

In accordance with embodiments of the present principles, various strategies to key frame selection to be processed by the slow branch 404 can be implemented. In one embodiment, a simple strategy is to determine the key frame based on a fixed time interval (such as every 1 or 0.5 seconds) or spatial interval (such as every traveled 1 or 3 meters). In some embodiments, a more advanced strategy can be implemented in which the selection of a key frame is based on conditions between query frame and past key frames, including the number of overlapped features, the temporal difference, and the spatial difference between poses associated with frames. In other embodiments, the selection of key frames can be dependent on the number of overlapped features between selected frames. A rule of thumb is that a number of overlapped features between key frames should be small (e.g. 5) and the temporal difference should be large.

In accordance with the present principles, in the fast branch 402, less than all of the classes of each video frame of either the RBG video or the depth-aware video are processed. For example and as depicted in the embodiment of FIG. 4, only the semantic classes including building and traffic lights are being processed in the frames of the first video in the fast branch 402 for semantic segmentation. In some embodiments, a number of classes to be processed in frames of the first video in the fast branch 401 can depend on several factors including which classes are of interest to a user, a desired speed of processing of the frames of the first video of the fast branch 402, classes that provide data of most interest, which can be determined in some cases by information regarding previous processing, and the like. In some embodiments in accordance with the present principles, a machine learning process can be implemented to determine, which classes should be processed in the frames of the first video in the fast branch 402, which in some embodiments can be a dynamic result. That is, in some embodiments, as video frames are processed, the classes to be processed in the frames of the first video in the fast branch 402 can change. In some embodiments, the fast branch 402 is considered and implemented as a temporally and geometrically consistent reference branch.

As depicted in FIG. 4, in the frames of the second video of the slow branch 404 all classes of selected key frames of RGBD video frames are processed. As further depicted in FIG. 4, the results of a warping process of the present principles can be applied to all classes of a predicted video frame in the first video of the fast branch 402 (described in greater detail below).

Figure 5:
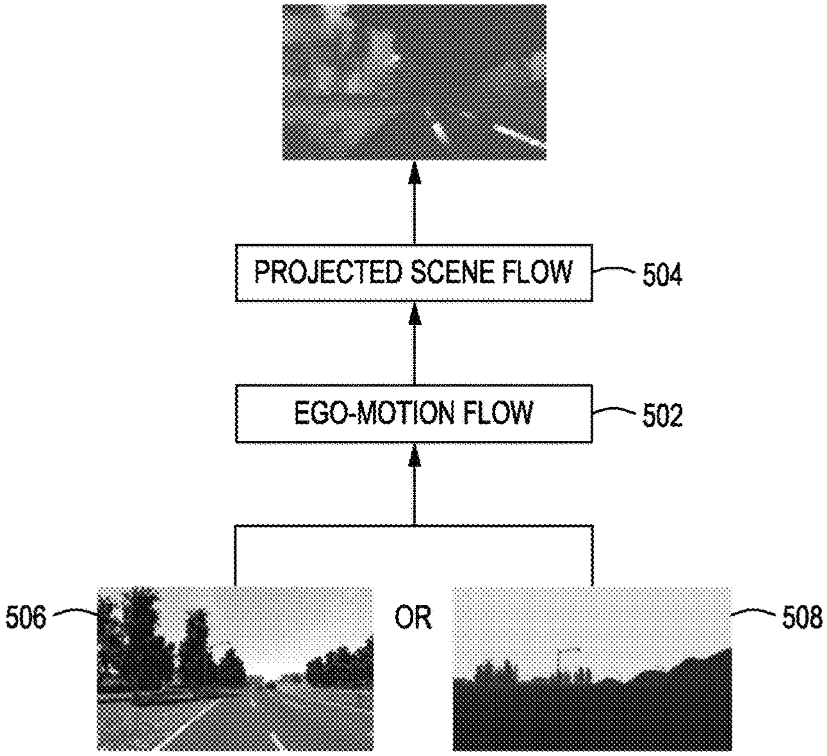
FIG. 5, depicts an example of a geometric warping process in accordance with an embodiment of the present principles.

In some embodiments, the slow branch 404 is considered and implemented as a semantically rich update branch. In the embodiment of FIG. 4, in accordance with the present principles, consistency is maintained between the frames of the first video of the fast branch 402 and the frames of the second video of the slow branch 404 by interchanging information between the fast branch 402 and the slow branch 404. For example, FIG. 5, depicts a flow diagram of a geometric warping process for maintaining consistency between the frames of the first video of the fast branch 402 and respective key frames of the second video of the slow branch 404 in accordance with an embodiment of the present principles. As depicted in FIG. 5, the geometric warping of the present principles can include an Ego-motion flow process 502 and a Projected scene flow process 504.

The Ego-motion flow process 502 of the present principles estimates ego-motion flow from depth and relative camera pose for each frame. The ego-motion flow process 502 is geometry preserving and robust to drastic scene changes because it considers the changes between two frames caused by only the camera motion and pose. By estimating and subtracting ego motion flow, the data of two images are made to appear closer to each other.

The projected scene flow process 504 of FIG. 5 estimates projected scene flow using optical flow neural networks. Projected scene flow accounts for pixel displacement due to moving objects in the scene. In some embodiments of the present principles, the determined projected scene flow can be used to correct an estimation error introduced from the Ego-motion flow process 502.

As depicted in FIG. 5, the ego-motion flow process 502 and the projected scene flow process 504 can be applied on either frames of the RGB video 506 or the depth-aware video 508 from either of the first video of the fast branch 402 or the second video of the slow branch 404 of the architecture of FIG. 4.

Figure 6:
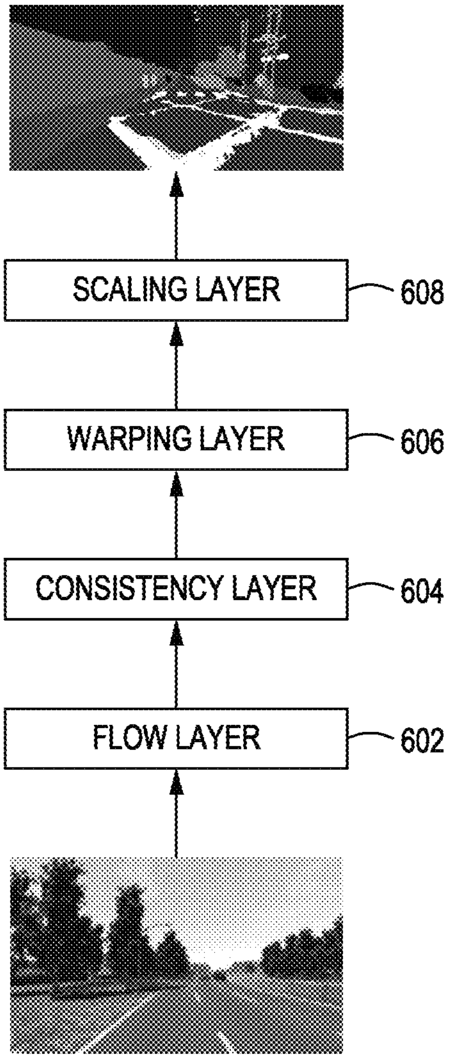
FIG. 6 depicts a flow diagram of a consistency process/layer implementing the information determined by the ego-motion flow process and the projected scene flow process of FIG. 5 in accordance with an embodiment of the present principles.

FIG. 6 depicts a flow diagram of a consistency process/layer 604 implementing the information determined by the ego-motion flow process 502 and the projected scene flow process 504 of FIG. 5 in accordance with an embodiment of the present principles. In the embodiment of FIG. 6, once the flow is determined using the ego-motion flow process 502 and the projected scene flow process 504 in, for example, a flow process/layer 602, geometric consistency can be compared between a subject video frame of the first video of the fast branch 402 and a respective key video frame selected for the second video of the slow branch 404 in, for example, a consistency process 604. In the consistency process 604 geometric properties of a subject video frame of the fast branch 402 can be adjusted to be more consistent with a respective key/target video frame selected for the slow branch 404.

Figure 7:
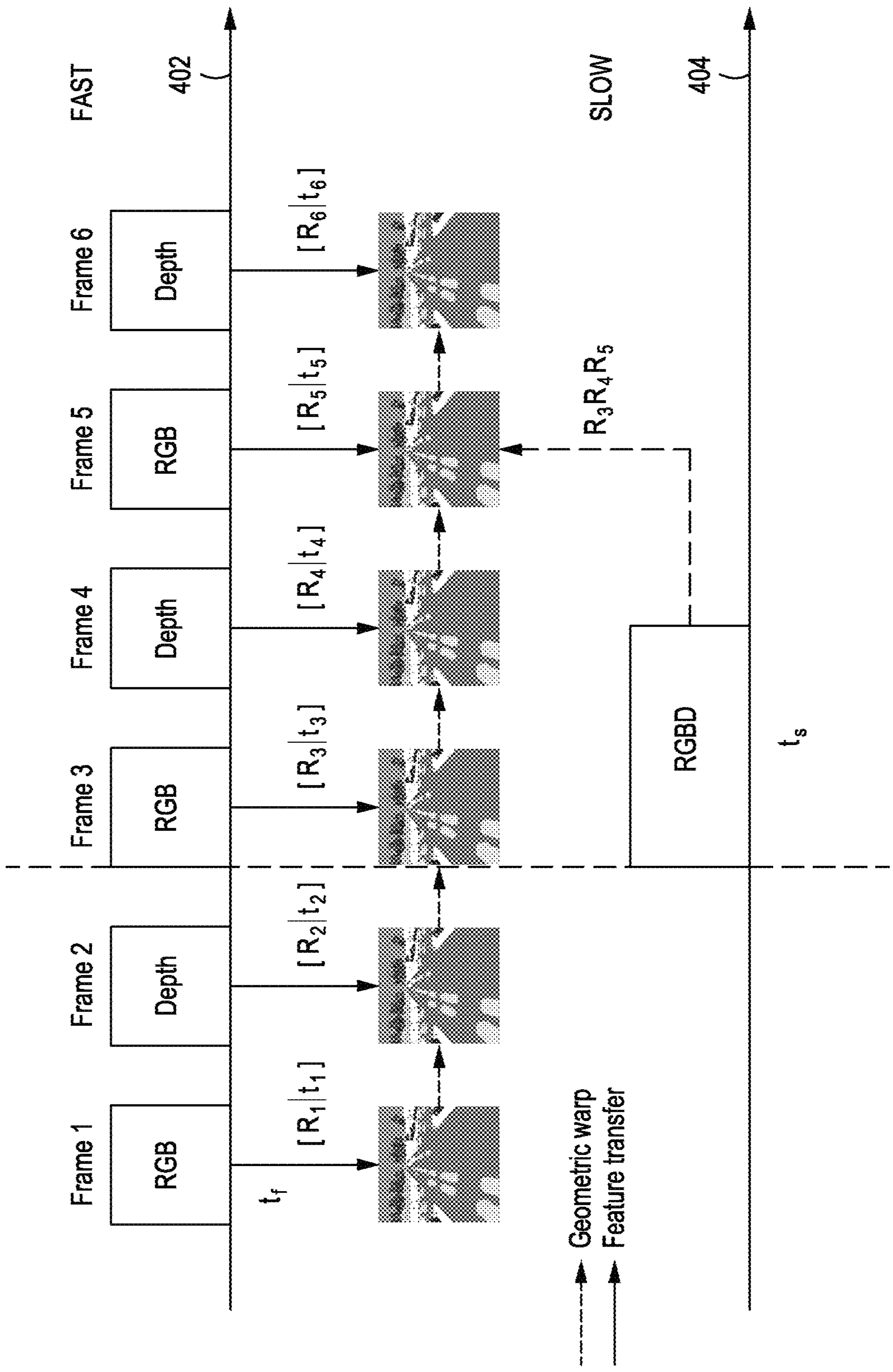
FIG. 7 depicts a flow diagram of a prediction process in accordance with an embodiment of the present principles.

In the embodiment of FIG. 6, the warping/prediction process 606 of the present principles can be implemented to predict/process a future video frame in the first video of the fast branch 402 of the present principles. For example, if a slow branch of the present principles is processing a key video frame equating to a third frame of a video in the fast branch, a fifth video frame in the fast branch can be predicted/processed from data determined from the key frame processed in the slow branch. For example, FIG. 7 depicts a flow diagram of a prediction process 606 in accordance with an embodiment of the present principles. In FIG. 7, $t_N$ depicts a time, t, it takes to process a frame, N, and $R_N$ depicts a processing result, R, of a frame, N.

As depicted in FIG. 7, in the fast branch 402 two frames (frame 1 and frame 2) of at least one of RGB video data or depth-aware data are processed to determine respective RGB semantic segmentation or depth segmentation information for each of the first two frames. In FIG. 7, a third frame (frame 3) in the slow branch 404 is selected as a key frame. In accordance with the present principles, instead of processing the third frame (frame 3) in the fast branch 402 and waiting until the third frame (frame 3) in the slow branch 404 is finished processing to enable the processed information from frame 3 of the slow branch 404 to be used to determined semantic segmentation information for frame 3 of the fast branch 402, the fast branch 402 processes frame 4 during the processing of frame 3 in the slow branch 404 and when the key frame (frame 3) is finished processing in the slow branch 404, the processed information from key frame 3 in the slow branch 404 is used to determine more accurate semantic segmentation information for frame 5 of the fast branch 402.

As further depicted in FIG. 7, the video frames of the first video of the fast branch are temporally aligned with key frames in the second video of the slow branch. For example, a period of the processing of a video frame in the fast branch 402 can depend on layers of neural networks implemented to process a determined number of classes of each video frame to be processed. As such, a number of video frames that can be processed in the fast branch 402 while a key frame is processed in the slow branch 404 can be dynamic. In some embodiments, one of the only restrictions for processing key frames in the slow branch 404 can include that the time period allotted for processing a key frame in the slow branch 404 must be long enough to process a depth map. In any event and as depicted in FIG. 7, respective video frames in the fast branch 402 and key frames in the slow branch 404 are synchronized to occur at the same time.

As further depicted in FIG. 7, in some embodiments of the present principles, along with features determined for images of each frame of the fast branch 402, geometric warping can be applied between at least the frames of the fast branch 402 to keep track of changes between the geometric properties of, for example in FIG. 7, continuous frames of the fast branch 402 to assist when determining at least one of semantic segmentation and depth segmentation data for images of the frames of the fast branch 402. As further depicted in FIG. 7, the described geometric warping can be implemented between a key frame of the slow branch 404 and a predicted frame of the fast branch 402 to assist when determining at least one of semantic segmentation and depth segmentation data for images of the frames of the fast branch 402.

In addition and referring back to the embodiment of FIG. 6, in some embodiments a scaling process 608 can be implemented in accordance with the present principles to further ensure consistency between the video frames in a fast branch of the present principles and respective key frame video frames in a slow branch of the present principles. In some embodiments, the scaling process 608 of the present principles raises/adjusts the entropy of pixels of, for example, a warped video frame inconsistent with current frames. In some embodiments of a scaling process 608, difference maps can be determined between a warped RGBD video frame and a current/respective RGB/D frame. In embodiments in accordance with the present principles, inconsistent pixels can be penalized with an exponential weighting to the original cross entropy loss in accordance with equation one (1), which follows:

$$warp - RGBt + norm\ Dwarp - Dt \log pc. \tag{1}$$

In some embodiments of the scaling process 608 small classes can be emphasized by using an inverse frequency weighting in accordance with equation two (2), which follows:

$$\text{loss} = -\frac{1}{N_c}\log p_c, \tag{2}$$

where $p_c$ depicts the ground truth class for the sample.

For example, FIG. 8 depicts a Table of improved semantic segmentation results for an RGBD semantic segmentation system of the present principles, such as the RGBD semantic segmentation system of FIG. 1, as a result of the application of a scaling process of the present principles, such as the scaling process 608 of FIG. 6. In the embodiment of FIG. 8, an RGBD semantic segmentation system of the present principles was applied to the Synthia dataset summer split to compare results with and without the application of a scaling process of the present principles. In the table of FIG. 8, RGB+D denotes semantic segmentation/fusion results of an RGB+D semantic segmentation system of the present principles without a scaling process of the present principles having been applied and RGBD+TempNet denotes segmentation/fusion results of an RGBD semantic segmentation system of the present principles with a scaling process of the present principles having been applied. That is, in the Table of FIG. 8, TempNet denotes an embodiment of a scaling process of the present principles.

The Table of FIG. 8 comprises a top section 802, a middle section 804 and a bottom section 806. The top section 802 of the Table of FIG. 8 depicts segmentation/fusion results of an RGBD semantic segmentation system of the present principles without the scaling process, RGB+D, and with the scaling process, RGBD+TempNet, over all classes of the Synthia dataset summer split dataset. In the Table of FIG. 8, benchmarks of accuracy, ACC, and IOU for semantic segmentation are displayed as an average over all classes of the Synthia dataset. As depicted in the top section 802 of FIG.

8, better fusion results for semantic segmentation are achieved for both ACC and IOU with the implementation of a scaling process of the present principles even over the already improved fusion results for semantic segmentation of an RGBD semantic segmentation system of the present principles not having the scaling process applied.

The middle section 804 of the Table of FIG. 8 depicts IOU benchmark results for eight (8) individual classes of the Synthia dataset for an RGBD semantic segmentation system of the present principles without the scaling process applied, RGB+D, and with the scaling process applied, RGBD+TempNet. As depicted in the middle section 804 of FIG. 8, better fusion results for semantic segmentation are achieved for the IOU benchmark with the implementation of a scaling process of the present principles even over the already improved fusion results for semantic segmentation of an RGBD semantic segmentation system of the present principles not having the scaling process applied.

The bottom section 806 of the Table of FIG. 8 depicts ACC benchmark results for eight (8) individual classes of the Synthia dataset for an RGBD semantic segmentation system of the present principles without the scaling process applied, RGB+D, and with the scaling process applied, RGBD+TempNet. As depicted in the bottom section 806 of FIG. 8, better fusion results for semantic segmentation are achieved for the ACC benchmark with the implementation of a scaling process of the present principles even over the already improved fusion results for semantic segmentation of an RGBD semantic segmentation system of the present principles not having the scaling process applied.

In at least the middle section 802 and the bottom section 804 of the Table of FIG. 8, it is depicted that an RGBD semantic segmentation system of the present principles can achieve better fusion results for semantic segmentation especially for small classes such as pedestrian and signs.

Figure 9:
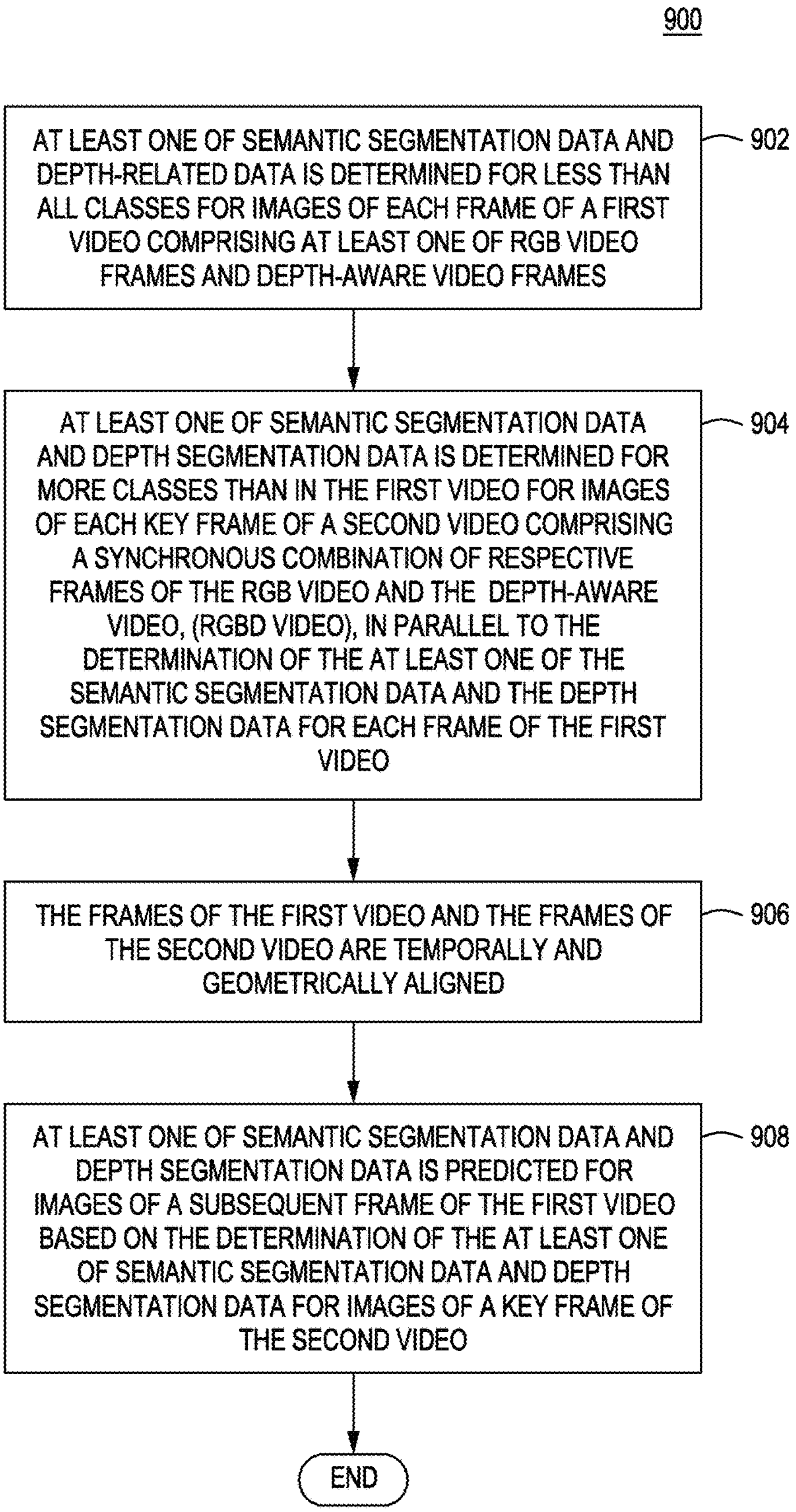
FIG. 9 depicts a flow diagram of a method for RGBD semantic segmentation of video in accordance with an embodiment of the present principles.

FIG. 9 depicts a flow diagram of a method 900 for RGBD semantic segmentation of video in accordance with an embodiment of the present principles. The method 900 can begin at 902 during which at least one of semantic segmentation data and depth-related data is determined for less than all classes for images of each frame of a first video comprising at least one of RGB video frames and depth-aware video frames. The method 900 can proceed to 904.

At 904, at least one of semantic segmentation data and depth segmentation data is determined for more classes than in the first video for images of each key frame of a second video comprising a synchronous combination of respective frames of the RGB video and the depth-aware video, (RGBD video), in parallel to the determination of the at least one of the semantic segmentation data and the depth segmentation data for each frame of the first video. The method 900 can proceed to 906.

At 906, the frames of the first video and the frames of the second video are temporally and geometrically aligned. The method 900 can proceed to 908.

At 908, at least one of semantic segmentation data and depth segmentation data is predicted for images of a subsequent frame of the first video based on the determination of the at least one of semantic segmentation data and depth segmentation data for images of a key frame of the second video.

In some embodiments of the present principles, the method 900 can further include adjusting at least an entropy of a predicted video frame if inconsistent with a previous frame of the at least one of the RGB video or the depth-aware video.

In some embodiments of the present principles, the first video and the second video can be received from respective capture devices mounted on a mobile platform and the method can further include receiving motion data from at least one of an inertial measurement unit and a wheel odometry unit associated with the mobile platform and providing at least one of navigation information and scene information to the mobile platform for at least one scene captured using the respective capture devices based on the received motion data and the at least one of the semantic segmentation data and depth segmentation data determined for at least one of the first video and the second video.

As depicted in FIG. 1, embodiments of an RGBD semantic segmentation system of the present principles, such as the RGBD semantic segmentation system 100 of FIG. 1, can be implemented in a computing device 1000 in accordance with the present principles. That is, in some embodiments, RGB video, depth-aware video and the like can be communicated to, for example, the slow processing module 105 and/or the fast-processing module 110 of the RGBD semantic segmentation system 100 using the computing device 1000 via, for example, any input/output means associated with the computing device 1000. Data associated with a semantic segmentation system in accordance with the present principles can be presented to a user using an output device of the computing device 1000, such as a display, a printer or any other form of output device.

Figure 10:
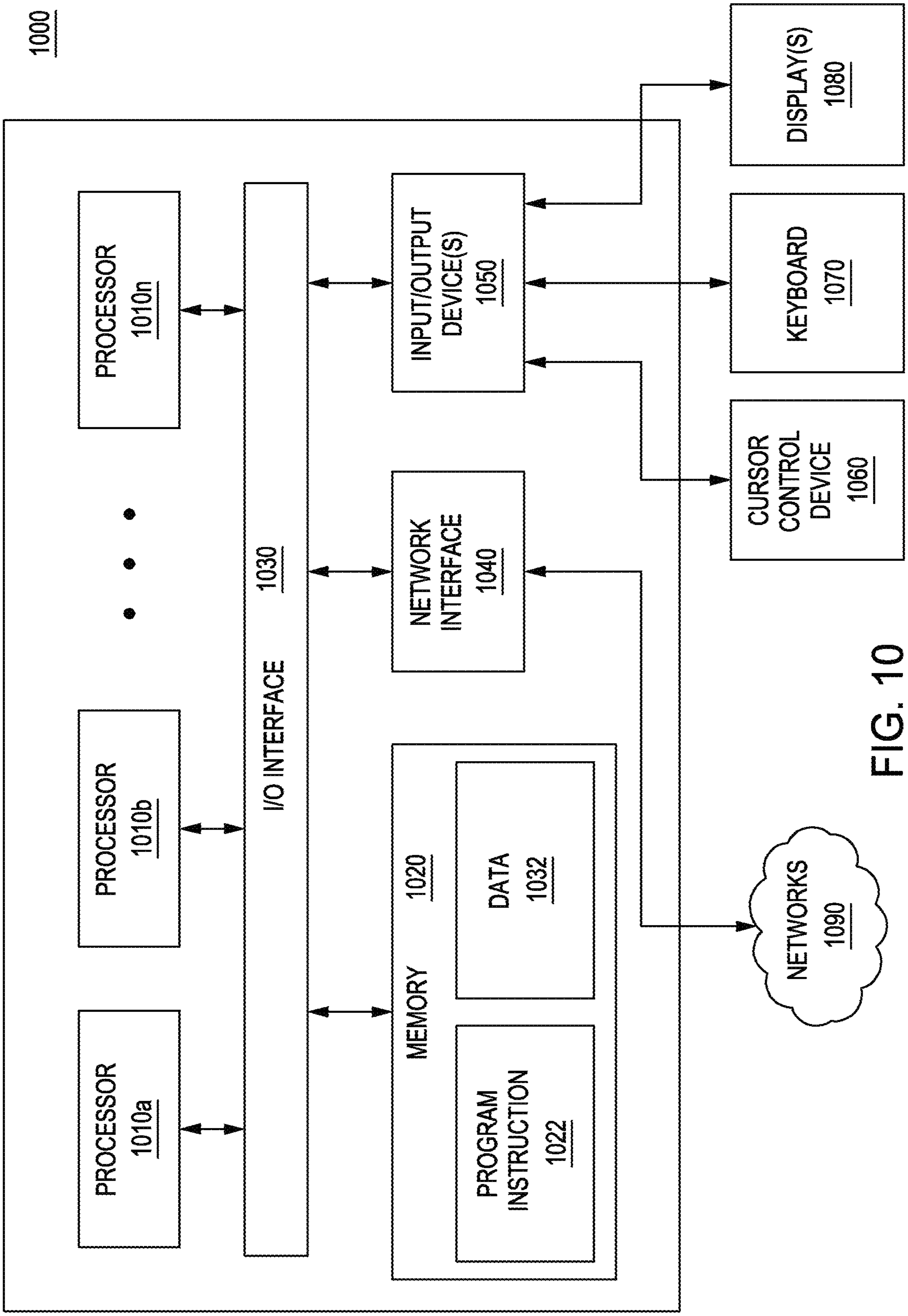
FIG. 10 depicts a high-level block diagram of a computing device suitable for use with an RGBD semantic segmentation system in accordance with embodiments of the present principles.

For example, FIG. 10 depicts a high-level block diagram of a computing device 1000 suitable for use with embodiments of a semantic segmentation system in accordance with the present principles such as the RGBD semantic segmentation system 100 of FIG. 1. In some embodiments, the computing device 1000 can be configured to implement methods of the present principles as processor-executable executable program instructions 1022 (e.g., program instructions executable by processor(s) 1010) in various embodiments.

In the embodiment of FIG. 10, the computing device 1000 includes one or more processors 1010*a*-1010*n* coupled to a system memory 1020 via an input/output (I/O) interface 1030. The computing device 1000 further includes a network interface 1040 coupled to I/O interface 1030, and one or more input/output devices 1050, such as cursor control device 1060, keyboard 1070, and display(s) 1080. In various embodiments, a user interface can be generated and displayed on display 1080. In some cases, it is contemplated that embodiments can be implemented using a single instance of computing device 1000, while in other embodiments multiple such systems, or multiple nodes making up the computing device 1000, can be configured to host different portions or instances of various embodiments. For example, in one embodiment some elements can be implemented via one or more nodes of the computing device 1000 that are distinct from those nodes implementing other elements. In another example, multiple nodes may implement the computing device 1000 in a distributed manner.

In different embodiments, the computing device 1000 can be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, the computing device 1000 can be a uniprocessor system including one processor 1010, or a multiprocessor system including several processors 1010 (e.g., two, four, eight, or another suitable number). Processors 1010 can be any suitable processor capable of executing instructions. For example, in various embodiments processors 1010 may be general-purpose or embedded processors implementing any of a variety of instruction set architectures (ISAs). In multiprocessor systems, each of processors 1010 may commonly, but not necessarily, implement the same ISA.

System memory 1020 can be configured to store program instructions 1022 and/or data 1032 accessible by processor 1010. In various embodiments, system memory 1020 can be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above can be stored within system memory 1020. In other embodiments, program instructions and/or data can be received, sent or stored upon different types of computer-accessible media or on similar media separate from system memory 1020 or computing device 1000.

In one embodiment, I/O interface 1030 can be configured to coordinate I/O traffic between processor 1010, system memory 1020, and any peripheral devices in the device, including network interface 1040 or other peripheral interfaces, such as input/output devices 1050. In some embodiments, I/O interface 1030 can perform any necessary protocol, timing or other data transformations to convert data signals from one component (e.g., system memory 1020) into a format suitable for use by another component (e.g., processor 1010). In some embodiments, I/O interface 1030 can include support for devices attached through various types of peripheral buses, such as a variant of the Peripheral Component Interconnect (PCI) bus standard or the Universal Serial Bus (USB) standard, for example. In some embodiments, the function of I/O interface 1030 can be split into two or more separate components, such as a north bridge and a south bridge, for example. Also, in some embodiments some or all of the functionality of I/O interface 1030, such as an interface to system memory 1020, can be incorporated directly into processor 1010.

Network interface 1040 can be configured to allow data to be exchanged between the computing device 1000 and other devices attached to a network (e.g., network 1090), such as one or more external systems or between nodes of the computing device 1000. In various embodiments, network 1090 can include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1040 can support communication via wired or wireless general data networks, such as any suitable type of Ethernet network, for example, via digital fiber communications networks; via storage area networks such as Fiber Channel SANs, or via any other suitable type of network and/or protocol.

Input/output devices 1050 can, in some embodiments, include one or more display terminals, keyboards, keypads, touchpads, scanning devices, voice or optical recognition devices, or any other devices suitable for entering or accessing data by one or more computer systems. Multiple input/output devices 1050 can be present in computer system or can be distributed on various nodes of the computing device 1000. In some embodiments, similar input/output devices can be separate from the computing device 1000 and can interact with one or more nodes of the computing device 1000 through a wired or wireless connection, such as over network interface 1040.

Those skilled in the art will appreciate that the computing device 1000 is merely illustrative and is not intended to limit the scope of embodiments. In particular, the computer system and devices can include any combination of hardware or software that can perform the indicated functions of various embodiments, including computers, network devices, Internet appliances, PDAs, wireless phones, pagers, and the like. The computing device 1000 can also be connected to other devices that are not illustrated, or instead can operate as a stand-alone system. In addition, the functionality provided by the illustrated components can in some embodiments be combined in fewer components or distributed in additional components. Similarly, in some embodiments, the functionality of some of the illustrated components may not be provided and/or other additional functionality can be available.

The computing device 1000 can communicate with other computing devices based on various computer communication protocols such a Wi-Fi, Bluetooth® (and/or other standards for exchanging data over short distances includes protocols using short-wavelength radio transmissions), USB, Ethernet, cellular, an ultrasonic local area communication protocol, etc. The computing device 1000 can further include a web browser.

Although the computing device 1000 is depicted as a general purpose computer, the computing device 1000 is programmed to perform various specialized control functions and is configured to act as a specialized, specific computer in accordance with the present principles, and embodiments can be implemented in hardware, for example, as an application specified integrated circuit (ASIC). As such, the process steps described herein are intended to be broadly interpreted as being equivalently performed by software, hardware, or a combination thereof.

Figure 11:
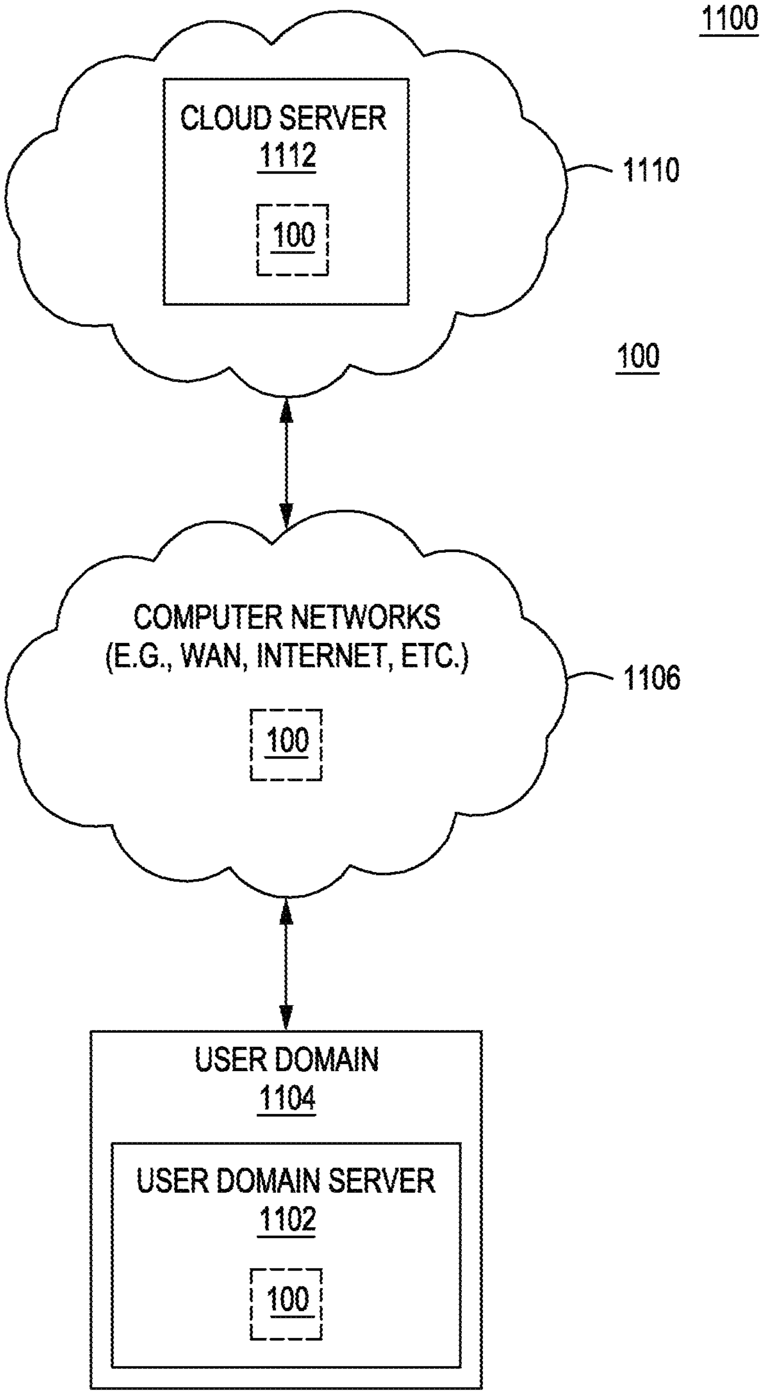
FIG. 11 depicts a high-level block diagram of a network in which embodiments of an RGBD semantic segmentation system in accordance with an embodiment of the present principles can be applied.

FIG. 11 depicts a high-level block diagram of a network in which embodiments of a semantic segmentation system in accordance with the present principles, such as the RGBD semantic segmentation system 100 of FIG. 1, can be applied. The network environment 1100 of FIG. 11 illustratively comprises a user domain 1102 including a user domain server/computing device 1104. The network environment 1100 of FIG. 11 further comprises computer networks 1106, and a cloud environment 1110 including a cloud server/computing device 1112.

In the network environment 1100 of FIG. 11, a system for RGBD semantic segmentation in accordance with the present principles, such as the system 100 of FIG. 1, can be included in at least one of the user domain server/computing device 1104, the computer networks 1106, and the cloud server/computing device 1112. That is, in some embodiments, a user can use a local server/computing device (e.g., the user domain server/computing device 1104) to provide RGBD semantic segmentation in accordance with the present principles.

In some embodiments, a user can implement a system for RGBD semantic segmentation in the computer networks 1106 to provide semantic segmentation in accordance with the present principles. Alternatively or in addition, in some embodiments, a user can implement a system for semantic segmentation in the cloud server/computing device 1112 of the cloud environment 1110 to provide RGBD semantic segmentation in accordance with the present principles. For example, in some embodiments it can be advantageous to perform processing functions of the present principles in the cloud environment 1110 to take advantage of the processing capabilities and storage capabilities of the cloud environment 1110. In some embodiments in accordance with the present principles, a system for providing semantic segmentation in a container network can be located in a single and/or multiple locations/servers/computers to perform all or portions of the herein described functionalities of a system in accordance with the present principles. For example, in some embodiments components of the RGBD semantic segmentation system, such as the slow processing module 105 and the fast-processing module 110 can be located in one or more than one of the user domain 1102, the computer network environment 1106, and the cloud environment 1110 for providing the functions described above either locally or remotely.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software components can execute in memory on another device and communicate with the illustrated computer system via inter-computer communication. Some or all of the system components or data structures can also be stored (e.g., as instructions or structured data) on a computer-accessible medium or a portable article to be read by an appropriate drive, various examples of which are described above. In some embodiments, instructions stored on a computer-accessible medium separate from the computing device 1000 can be transmitted to the computing device 1000 via transmission media or signals such as electrical, electromagnetic, or digital signals, conveyed via a communication medium such as a network and/or a wireless link. Various embodiments can further include receiving, sending or storing instructions and/or data implemented in accordance with the foregoing description upon a computer-accessible medium or via a communication medium. In general, a computer-accessible medium can include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

Figure 12:
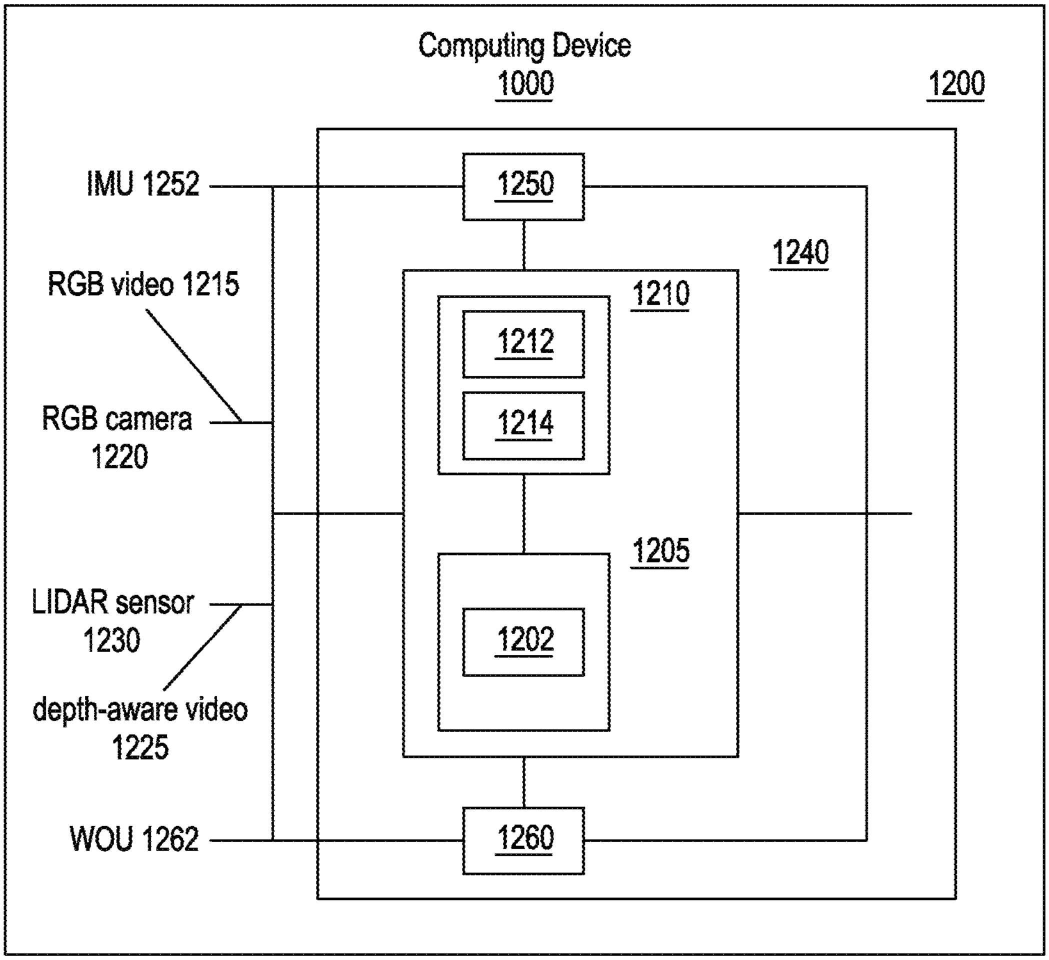
FIG. 12 depicts a high-level block diagram of an alternate embodiment of an RGBD semantic segmentation system in accordance with an embodiment of the present principles.

FIG. 12 depicts a high-level block diagram of an alternate embodiment of an RGBD semantic segmentation system 1200 in accordance with the present principles. The RGBD semantic segmentation system 1200 of FIG. 12 illustratively comprises a slow processing module 1205 and a fast-processing module 1210. In the embodiment of FIG. 12, the slow processing module 1205 comprises an RGBD semantic segmentation processing module 1202 and the fast-processing module 1210 comprises an RGB semantic segmentation module 1212 and a depth map processing module 1214. In the embodiment of FIG. 12, inputs to the RGBD semantic segmentation system 1200 can include RGB video/data 1215 from, for example an RGB camera 1220 and depth-aware video/data 1225 from, for example at least one LIDAR sensor 1230. In the embodiment of the present principles depicted in FIG. 12, the slow processing module 1205 and the fast-processing module 1210 comprise a semantic segmentation sub-system 1240. In some embodiments of the present principles, the semantic segmentation sub-system 1240 of FIG. 12 can comprise the RGBD semantic segmentation system 100 of FIG. 1.

The embodiment of the RGBD semantic segmentation system 1200 of FIG. 12 further comprises a multi-sensor odometry module 1250 and a 3D mapping module 1260. The multi-sensor odometry module 1250 can receive inputs from at least one inertial measurement unit (IMU) 1252, at least one wheel odometry unit (WOU) 1262, the RGB camera 1220, and the at least one LIDAR sensor 1230. The 3D mapping module 1260 can receive inputs from the RGB camera 1220, and the at least one LIDAR sensor 1230.

The semantic segmentation system 1200 of the embodiment of FIG. 12 integrates sensor measurements from the four sensor modalities (IMU, RGB camera(s), LIDAR sensor(s), and wheel odometry) using a factor graph framework. Factor graph networks encode the factored nature of the probability density over the navigation states (3D position, 3D orientation, and 3D velocity at any given time), clearly separating the state representation from the constraints induced by the sensor measurements. The connectivity of the factor graph defines which state variables are affected by which sensor measurements.

In some embodiments of the present principles, the semantic segmentation system 1200 of the embodiment of FIG. 12 receives inputs from two LIDAR units: a forward-facing navigation 3D LIDAR (not shown) contributes to both multi-sensor odometry and 3D mapping, while an upward-facing mapping 2D LIDAR (not shown) is used to increase the coverage of 3D mapping of the perceived environment. Inputs to a semantic segmentation system of the present principles, such as the semantic segmentation system 1200 of the embodiment of FIG. 12, can be received from sensors mounted on a mobile platform, such as a robot.

The semantic segmentation system 1200 of the embodiment of FIG. 12 utilizes a parallel architecture to simultaneously compute a motion over time (multi-sensor odometry) and model a perceived environment (3D mapping and semantic segmentation). The multi-sensor odometry module 1250 of the semantic segmentation system 1200 of the embodiment of FIG. 12 implements a tightly-coupled visual-inertial odometry mechanism to fuse IMU data and RGB feature track measurements. Inertial measurements from the IMU 1252 are produced at a much higher rate than other sensors and so the multiple consecutive inertial readings are summarized between two navigation states created at the time when other sensor measurements come (such as RGB features from a video frame). The determined IMU factor generates 6 degrees of freedom relative pose and corresponding velocity change as an underlying motion model. Sensor measurements are further integrated from the LIDAR sensor(s) 1230 and the wheel odometry 1262 in a loosely-coupled manner.

In some embodiments, for LIDAR data, the semantic segmentation system 1200 can use a Fast-GICP algorithm to perform an efficient voxel-based generalized Iterative Closet Point (ICP) process to register 3D LIDAR points obtained from sequential scans (scan-to-scan registration). A 3D related pose measurement across sequential scans is then generated and fused. The wheel odometry readings are integrated as 3D velocity measurements, rather than related pose constraints or simple speed. Therefore, the wheel odometry is formulated as a 3D velocity vector that constraints speed in a local direction of a subject mobile platform and naturally encompasses backward and forward motions.

Referring back to FIG. 12, in some embodiments, the 3D mapping module 1260 is enabled by vision-based loop detection and pose graph optimization, which establishes associations (loops) across non-consecutive frames taken at different times. These associations are used to optimized past poses involved within the loops. Both multi-sensor odometry poses and loop-closure optimized poses are used to continuously integrate 3D mapped LIDAR points accumulated from past scans.

In some embodiments, during navigation, key frames are selected from input video streams and can be added into a database. The database entries can include video frame(s) that hold the collection of key points with their descriptors, image locations, and 3D world coordinates computed from triangulation across matched stereo 2D points across video frames. In some embodiments, a selection can be based on conditions between new frame and past key frames, including the number of overlapped features, a temporal difference, and a spatial difference between poses associated with frames. In some embodiments, loop detection is achieved by matching a new image to the database of key frames. If a frame is matched to a key frame that has been added before, it indicates the matched key frame was acquired when the mobile platform previously visited the same location. As such, these matches can be treated as loop closures to optimize past poses involved within the loop, which is the typical pose graph optimization process. The optimized pose can be fed back to the multi-sensor odometry module 1250 to correct the drift for a real-time navigation solution.

The semantic segmentation sub-system 1240 of the semantic segmentation system 1200 of FIG. 12 produces semantically labeled images as described above with respect to the RGBD semantic segmentation system 100 of FIG. 1. In the embodiment of FIG. 12, the images can then be back-projected onto a parent 3D map to label individual points of the LIDAR point cloud. The annotated 3D points are then accumulated to produce a semantically labeled 3D map. In some embodiments, the 3D map can be refined by identifying and removing nonrigid classes of the 3D map as well as, in some embodiments, non-Lambertian surfaces classes. Embodiments of a semantic segmentation system 1200 of the embodiment of FIG. 12 leverage a multi-sensor navigation architecture to fuse vision with additional sensing modalities, including an inertial measurement unit (IMU), LIDAR, and wheel odometry to provide accurate navigation and scene understanding for mobile platforms.

The methods and processes described herein may be implemented in software, hardware, or a combination thereof, in different embodiments. In addition, the order of methods can be changed, and various elements can be added, reordered, combined, omitted or otherwise modified. All examples described herein are presented in a non-limiting manner. Various modifications and changes can be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances can be provided for components described herein as a single instance. Boundaries between various components, operations and data stores are somewhat arbitrary, and particular operations are illustrated in the context of specific illustrative configurations. Other allocations of functionality are envisioned and can fall within the scope of claims that follow. Structures and functionality presented as discrete components in the example configurations can be implemented as a combined structure or component. These and other variations, modifications, additions, and improvements can fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure can be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described can include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure can be implemented in hardware, firmware, software, or any combination thereof. Embodiments can also be implemented as instructions stored using one or more machine-readable media, which may be read and executed by one or more processors. A machine-readable medium can include any mechanism for storing or transmitting information in a form readable by a machine (e.g., a computing device or a "virtual machine" running on one or more computing devices). For example, a machine-readable medium can include any suitable form of volatile or non-volatile memory.

In addition, the various operations, processes, and methods disclosed herein can be embodied in a machine-readable medium and/or a machine accessible medium/storage device compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium/storage device.

Modules, data structures, and the like defined herein are defined as such for ease of discussion and are not intended to imply that any specific implementation details are required. For example, any of the described modules and/or data structures can be combined or divided into sub-modules, sub-processes or other units of computer code or data as can be required by a particular design or implementation.

In the drawings, specific arrangements or orderings of schematic elements can be shown for ease of description. However, the specific ordering or arrangement of such elements is not meant to imply that a particular order or sequence of processing, or separation of processes, is required in all embodiments. In general, schematic elements used to represent instruction blocks or modules can be implemented using any suitable form of machine-readable instruction, and each such instruction can be implemented using any suitable programming language, library, application-programming interface (API), and/or other software development tools or frameworks. Similarly, schematic elements used to represent data or information can be implemented using any suitable electronic arrangement or data structure. Further, some connections, relationships or associations between elements can be simplified or not shown in the drawings so as not to obscure the disclosure.

This disclosure is to be considered as exemplary and not restrictive in character, and all changes and modifications that come within the guidelines of the disclosure are desired to be protected.

The invention claimed is:

1. A method for RGBD semantic segmentation of video data, comprising:

determining at least one of semantic segmentation data and depth segmentation data for less than all classes for images of each frame of a first video comprising at least one of RGB video frames and depth-aware video frames;

determining at least one of semantic segmentation data and depth segmentation data for more classes than in the first video for images of each key frame of a second video comprising a synchronous combination of respective frames of the RGB video frames and the depth-aware video frames, (RGBD video), in parallel to the determination of the at least one of the semantic segmentation data and the depth segmentation data for each frame of the first video;

temporally and geometrically aligning respective frames of the first video and the second video; and predicting at least one of semantic segmentation data and depth segmentation data for images of a subsequent frame of the first video based on the determination of the at least one of semantic segmentation data and depth segmentation data for images of a key frame of the second video;

wherein the first video comprises an alternating pattern of RGB video frames and depth-aware video frames.

2. The method of claim 1, wherein RGBD semantic segmentation for the first video is determined based on the at least one of the semantic segmentation data and the depth segmentation data determined for the images of each of the frames of the first video and the at least one of the semantic segmentation data and the depth segmentation data predicted for the images of the subsequent frames of the first video.

3. The method of claim 1, further comprising applying a scaling process to raise an entropy of inconsistent pixels of the images of the frames of at least one of the first video or the second video.

4. The method of claim 1, wherein temporally and geometrically aligning frames of the first video and the second video comprises applying a two-stage process including at least an ego-motion flow process and a projected scene flow process.

5. The method of claim 4, wherein the projected scene flow process corrects an estimation error introduced by the ego-motion flow process.

6. The method of claim 1, wherein the first video and the second video are received from respective capture devices mounted on a mobile platform and the method further comprises:

receiving motion data from at least one of an inertial measurement unit and a wheel odometry unit associated with the mobile platform; and providing at least one of navigation information and scene information to the mobile platform for at least one scene captured using the respective capture devices based on the received motion data and the at least one of the semantic segmentation data and depth segmentation data determined for at least one of the first video and the second video.

7. The method of claim 1, wherein at least one of the semantic segmentation data and the depth segmentation data is determined for all semantic classes of the images in each of the frames of the second video.

8. A non-transitory machine-readable medium having stored thereon at least one program, the at least one program including instructions which, when executed by a processor, cause the processor to perform a method in a processor-based system for RGBD semantic segmentation of video data, comprising:

determining at least one of semantic segmentation data and depth-related data for less than all classes for images of each frame of a first video comprising at least one of RGB video frames and depth-aware video frames;

determining at least one of semantic segmentation data and depth-related data for more classes than in the first video for images of each key frame of a second video comprising a synchronous combination of respective frames of the RGB video frames and the depth-aware video frames, (RGBD video), in parallel to the determination of the at least one of the semantic segmentation data and the depth-related data for the images of each frame of the first video;

temporally and geometrically aligning respective frames of the first video and the second video; and predicting at least one of semantic segmentation data and depth-related data for images of a subsequent frame of the first video based on the determination of the at least one of semantic segmentation data depth-related data for images of a key frame of the second video;

wherein the first video comprises an alternating pattern of RGB video frames and depth-aware video frames.

9. The non-transitory machine-readable medium of claim 8, wherein RGBD semantic segmentation for the first video is determined based on the at least one of the semantic segmentation data and the depth-related data determined for the images of each of the frames of the first video and the at least one of the semantic segmentation data and the depth-related data predicted for the images of the subsequent frames of the first video.

10. The non-transitory machine-readable medium of claim 8, further comprising applying a scaling process to adjust an entropy of inconsistent pixels of frames of at least one of the first video or the second video.

11. The non-transitory machine-readable medium of claim 8, wherein whether to implement RGB video frames or a depth-aware video frames in the first video is determined based on data contained in each of the RGB video frames or the depth-aware video frames.

12. The non-transitory machine-readable medium of claim 8, wherein determining semantic segmentation data comprises:

determining respective features of images in video frames; and implementing at least one of a machine learning process and a neural network to determine respective semantic class layers for the images of each of the video frames.

13. The non-transitory machine-readable medium of claim 8, wherein temporally and geometrically aligning frames of the first video and the second video comprises applying a two-stage process including at least an ego-motion flow process and a projected scene flow process.

14. The non-transitory machine-readable medium of claim 8, wherein the first video and the second video are received from respective capture devices mounted on a mobile platform and the method further comprises:

receiving motion data from at least one of an inertial measurement unit and a wheel odometry unit; and providing at least one of navigation information and scene information to the mobile platform for at least one scene captured using the respective capture devices based on the received motion data and the at least one of the semantic segmentation data and depth-related data determined for at least one of the first video and the second video.

15. The non-transitory machine-readable medium of claim 8, wherein that at least one of the semantic segmentation data and the depth-related data is determined for all semantic classes of the images in each of the key frames of the second video.

16. A system for RGBD semantic segmentation of video data, comprising:

a processor; and a memory coupled to the processor, the memory having stored therein at least one of programs or instructions executable by the processor to configure the system to:

determine at least one of semantic segmentation data and depth segmentation data for less than all classes for images of each frame of a first video comprising at least one of RGB video frames and depth-aware video frames;

determine at least one of semantic segmentation data and depth segmentation data for more classes than in the first video for images of each key frame of a second video comprising a synchronous combination of respective frames of the RGB video frames and the depth-aware video frames, (RGBD video), in parallel to the determination of the at least one of the semantic segmentation data and the depth segmentation data for each frame of the first video;

temporally and geometrically align respective frames of the first video and the second video; and predict at least one of semantic segmentation data and depth segmentation data for images of a subsequent frame of the first video based on the determination of the at least one of semantic segmentation data and depth segmentation data for images of a key frame of the second video;

wherein the first video comprises an alternating pattern of RGB video frames and depth-aware video frames.

17. The system of claim 16, wherein the first video and the second video are received from respective capture devices mounted on a mobile platform and the system is further configured to:

receive motion data from at least one of an inertial measurement unit and a wheel odometry unit associated with the mobile platform; and provide at least one of navigation information and scene information to the mobile platform for at least one scene captured using the respective capture devices based on the received motion data and the at least one of the semantic segmentation data and the depth segmentation data determined for at least one of the first video and the second video.

18. The system of claim 16, wherein the first video and the second video are temporally and geometrically aligned to maintain temporal and geometric consistency between at least respective frames of the first video and the second video and continuous frames of each of the first video and the second video.

19. The system of claim 16, wherein temporally and geometrically aligning frames of the first video and the second video comprises applying a two-stage process including at least an ego-motion flow process and a projected scene flow process, wherein the projected scene flow process corrects an estimation error introduced by the ego-motion flow process.

20. A method for RGBD semantic segmentation of video data, comprising:

determining at least one of semantic segmentation data and depth segmentation data for less than all classes for images of each frame of a first video comprising at least one of RGB video frames and depth-aware video frames;

determining at least one of semantic segmentation data and depth segmentation data for more classes than in the first video for images of each key frame of a second video comprising a synchronous combination of respective frames of the RGB video frames and the depth-aware video frames, (RGBD video), in parallel to the determination of the at least one of the semantic segmentation data and the depth segmentation data for each frame of the first video;

temporally and geometrically aligning respective frames of the first video and the second video; and predicting at least one of semantic segmentation data and depth segmentation data for images of a subsequent frame of the first video based on the determination of the at least one of semantic segmentation data and depth segmentation data for images of a key frame of the second video;

wherein temporally and geometrically aligning frames of the first video and the second video comprises applying a two-stage process including at least an ego-motion flow process and a projected scene flow process, wherein the projected scene flow process corrects an estimation error introduced by the ego-motion flow process.

* * * * *